US009727232B2

(12) United States Patent
Dixit

(10) Patent No.: US 9,727,232 B2
(45) Date of Patent: Aug. 8, 2017

(54) METHODS, APPARATUSES, AND COMPUTER PROGRAM PRODUCTS FOR IMPROVING DEVICE BEHAVIOR BASED ON USER INTERACTION

(75) Inventor: Amitabh Dixit, Irving, TX (US)

(73) Assignee: Nokia Technologies Oy, Espoo (FI)

( * ) Notice: Subject to any disclaimer, the term of this patent is extended or adjusted under 35 U.S.C. 154(b) by 458 days.

(21) Appl. No.: 13/250,095

(22) Filed: Sep. 30, 2011

(65) Prior Publication Data

US 2013/0082916 A1    Apr. 4, 2013

(51) Int. Cl.
*G06F 3/0488* (2013.01)
*G06F 3/01* (2006.01)

(52) U.S. Cl.
CPC .......... *G06F 3/04883* (2013.01); *G06F 3/011* (2013.01); *G06F 2203/011* (2013.01)

(58) Field of Classification Search
USPC ................................................. 345/173–178
See application file for complete search history.

(56) References Cited

U.S. PATENT DOCUMENTS

| 6,190,314 B1 | 2/2001 | Ark et al. |
| 6,516,421 B1 | 2/2003 | Peters |
| 7,383,457 B1 | 6/2008 | Knight |
| 7,665,024 B1 | 2/2010 | Kondziela |
| 7,983,920 B2 | 7/2011 | Sinclair, II |
| 2005/0091364 A1 | 4/2005 | Bantz et al. |
| 2005/0177832 A1* | 8/2005 | Chew .................. G06F 9/44594 718/104 |
| 2006/0190822 A1 | 8/2006 | Basson et al. |
| 2007/0300185 A1 | 12/2007 | Macbeth et al. |
| 2008/0080396 A1* | 4/2008 | Meijer et al. ................. 370/254 |
| 2010/0082516 A1* | 4/2010 | Basu .................... G05B 13/048 706/47 |
| 2010/0257185 A1* | 10/2010 | Dvir et al. .................... 707/748 |
| 2011/0004575 A1 | 1/2011 | Yang et al. |
| 2011/0283189 A1 | 11/2011 | McCarty |

(Continued)

FOREIGN PATENT DOCUMENTS

| EP | 1 246 146 A2 | 10/2002 |
| WO | WO 00/26829 A1 | 5/2000 |
| WO | WO-01/86403 A2 | 11/2001 |

OTHER PUBLICATIONS

International Search Report and Written Opinion for Application No. PCT/IB2012/055108; dated Jul. 2, 2013.

(Continued)

*Primary Examiner* — Sarvesh J Nadkarni
(74) *Attorney, Agent, or Firm* — Alston & Bird LLP

(57) ABSTRACT

Methods, apparatuses, and computer program products are herein provided for improving operation of a device based upon user interaction. A method may include receiving user input. The method may further include determining a user state value based at least in part on the received user input, wherein the user state value corresponds to a patience level of the user with the current rate of operation of the device. The method may further include causing modification in the operation of the device based at least in part on comparison of the user state value to a threshold user state value. Corresponding apparatuses and computer program products are also provided.

18 Claims, 7 Drawing Sheets

(56) References Cited

U.S. PATENT DOCUMENTS

2012/0068845 A1\* 3/2012 Kruglick ................. 340/540
2012/0226993 A1 9/2012 Bromer

OTHER PUBLICATIONS

Extended European Search Report for corresponding European Application No. 12836228.2 dated Jun. 3, 2015, 9 pages.
Office Action for corresponding European Application No. 12836228.2 dated Aug. 19, 2016.

\* cited by examiner

METHODS, APPARATUSES, AND COMPUTER PROGRAM PRODUCTS FOR IMPROVING DEVICE BEHAVIOR BASED ON USER INTERACTION

TECHNOLOGICAL FIELD

Example embodiments of the present invention relate generally to user interface technology and, more particularly, relate to methods, apparatuses, and computer program products for improving operation of devices based upon user interaction.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

The increase in functionality of mobile computing devices has caused users to rely more often on these devices, particularly while the user is on the go. This increased functionality can be detrimental, however, as users also utilize these devices for multiple applications and functions, often at the same time. Additionally, the small form factor of these devices limits the available processing power. Running too many applications or downloading large files may cause the operation rate of the device to slow, which can lead to frustration by the user, especially when a user is in a rush.

BRIEF SUMMARY

Operation speed can often be paramount, particularly when a user is in a hurry. When performance is poor, a user may get frustrated and anxious. The user may show this frustration in various ways, often toward the device. Some of the user's acts can indicate frustration with the current operation speed of the device, such as when a user hits the device or repeatedly presses the refresh button in a short period of time. Embodiments of the present invention may use these cues from the user to determine the user's patience level and attempt to modify the current operation of the device to increase the performance speed.

As such, embodiments of the present invention provide methods, apparatuses, and computer program products for improving operation of a device based on user interaction. In one example embodiment, a method may include receiving user input. The method may further include determining a user state value based at least in part on the received user input, wherein the user state value corresponds to a patience level of the user with the current rate of operation of the device. The method may further include causing modification in the operation of the device based at least in part on comparison of the user state value to a threshold user state value.

In another example embodiment, an apparatus comprising at least one processor and at least one memory storing computer program code, wherein the at least one memory and stored computer program code are configured, with the at least one processor, to cause the apparatus to receive user input. The at least one memory and stored computer program code are configured, with the at least one processor, to further cause the apparatus to determine a user state value based at least in part on the received user input, wherein the user state value corresponds to a patience level of the user with the current rate of operation of the device. The at least one memory and stored computer program code are configured, with the at least one processor, to further cause the apparatus to cause modification in the operation of the device based at least in part on comparison of the user state value to a threshold user state value.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method comprising receiving user input. The method may further include determining a user state value based at least in part on the received user input, wherein the user state value corresponds to a patience level of the user with the current rate of operation of the device. The method may further include causing modification in the operation of the device based at least in part on comparison of the user state value to a threshold user state value.

In another example embodiment, an apparatus is provided. The apparatus comprises means for receiving user input. The apparatus may further include a means for determining a user state value based at least in part on the received user input, wherein the user state value corresponds to a patience level of the user with the current rate of operation of the device. The apparatus may further include a means for causing modification in the operation of the device based at least in part on comparison of the user state value to a threshold user state value.

BRIEF DESCRIPTION OF THE DRAWINGS

Figure 1:
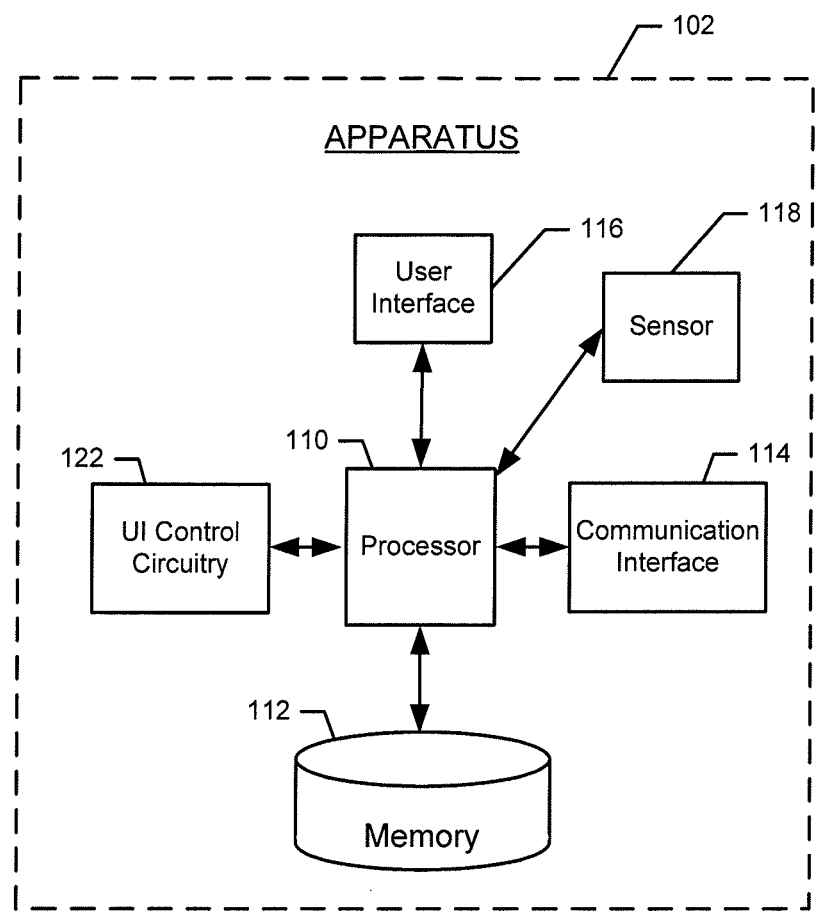
Figure 2:
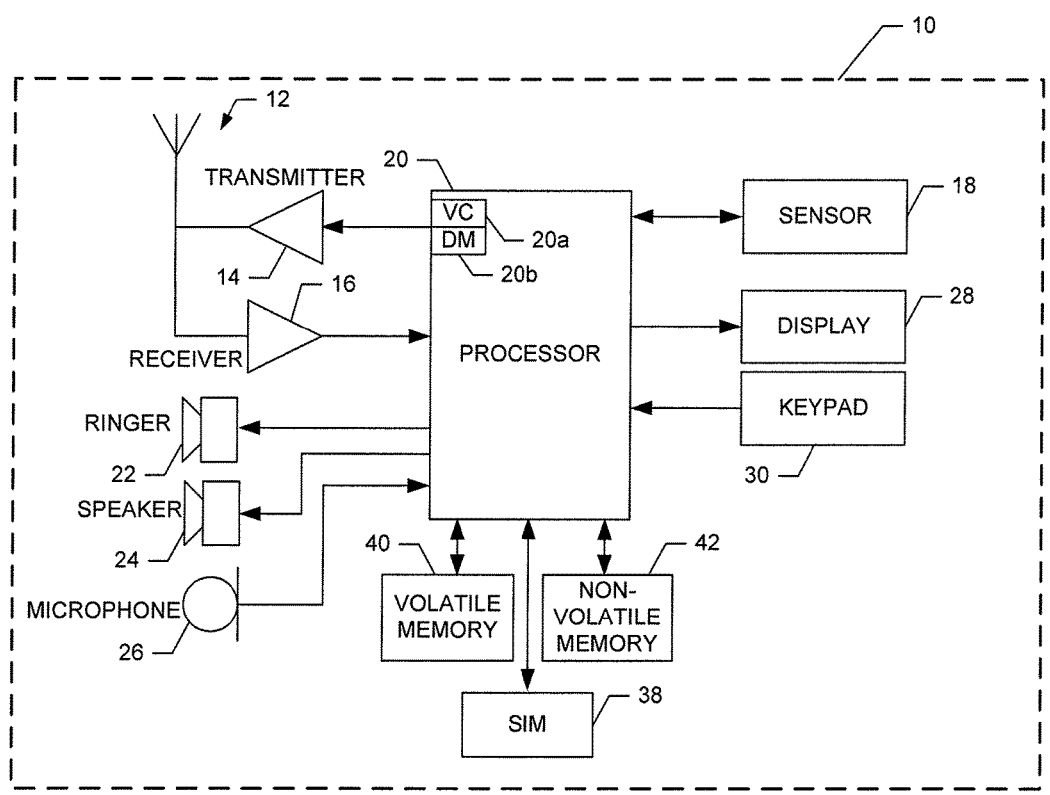
Figure 3A:
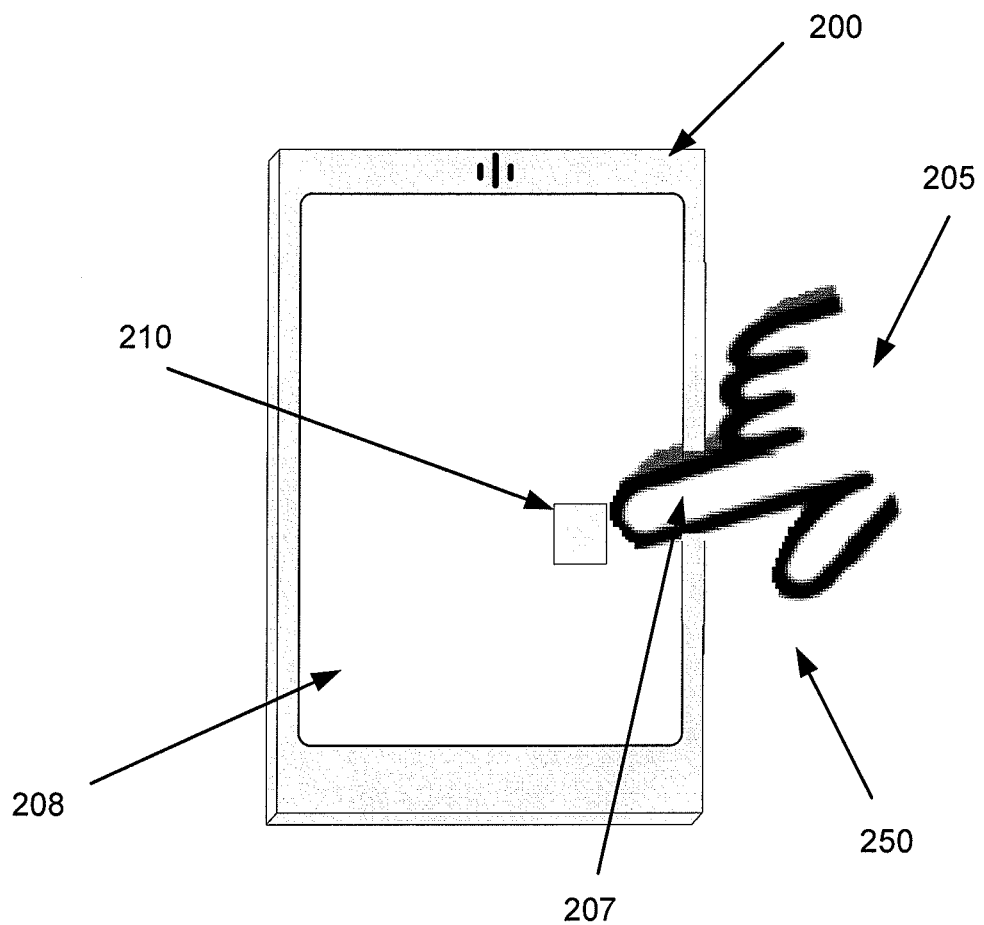
Figure 3B:
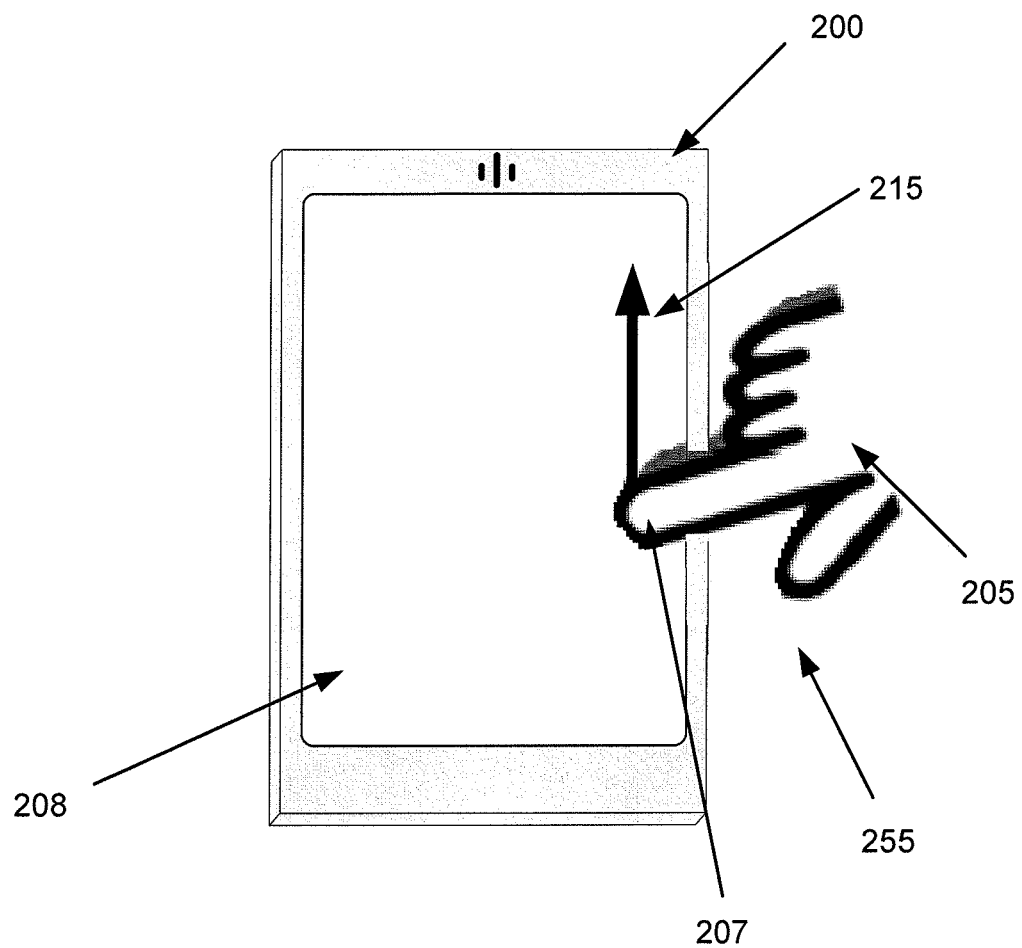
Figure 4:
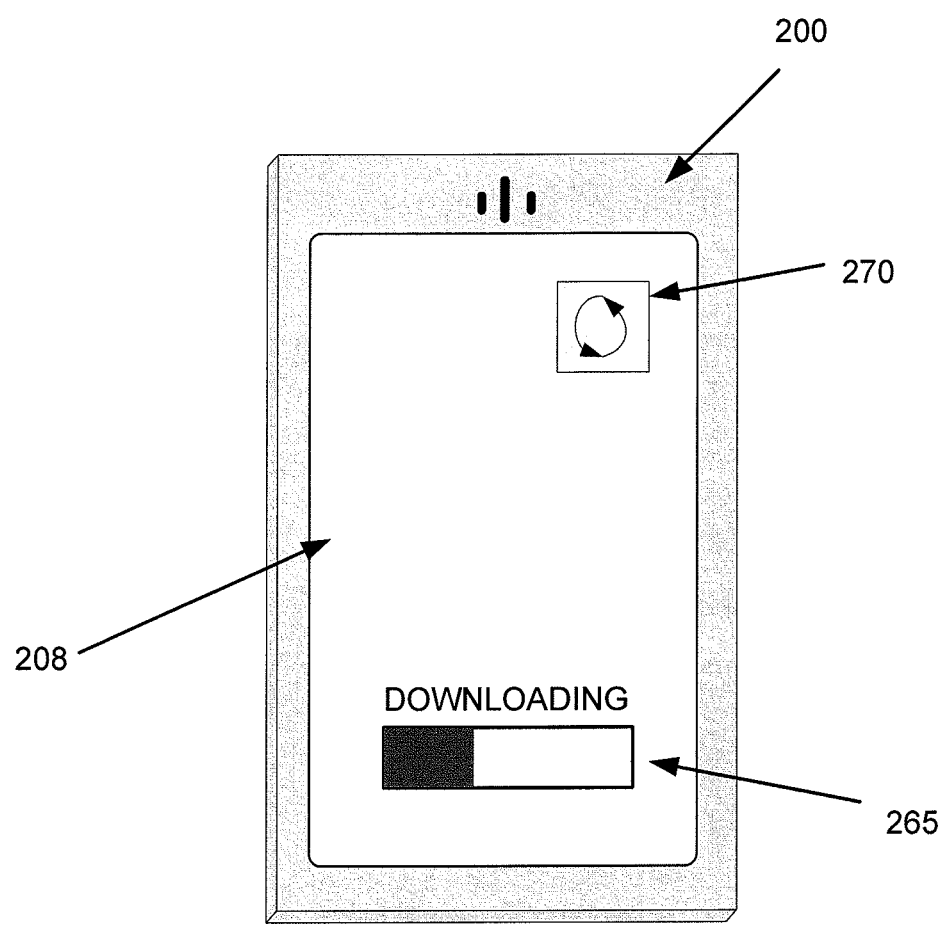
Figure 5:
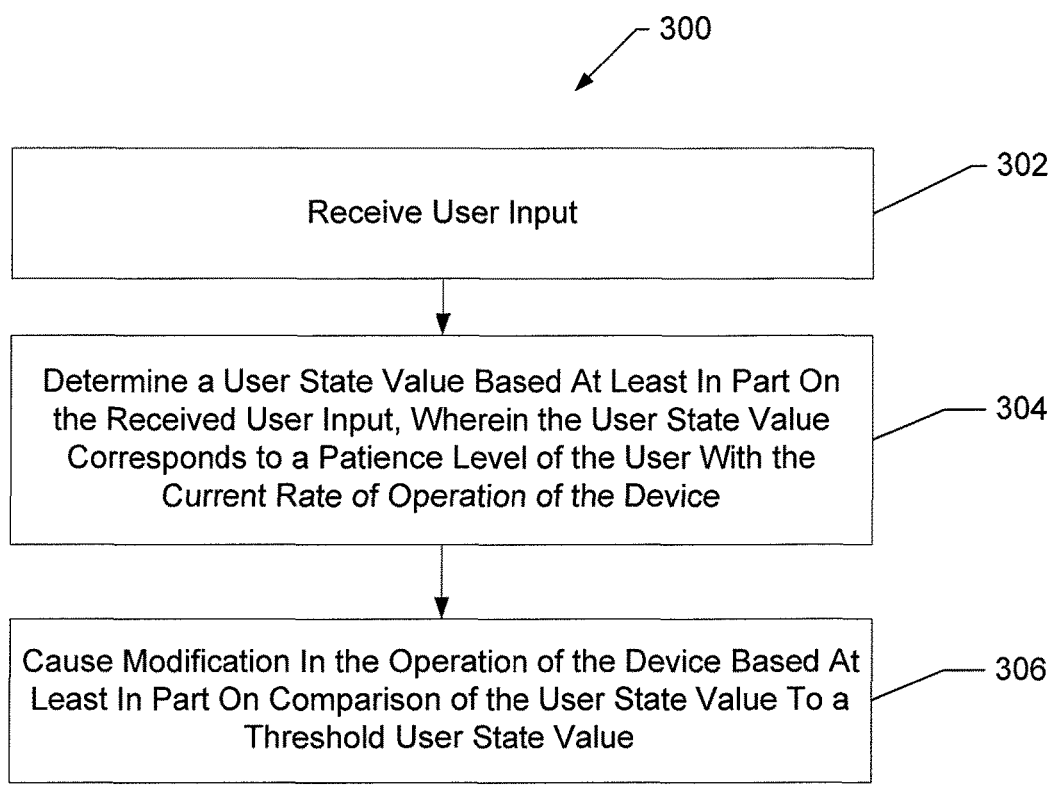
Figure 6:
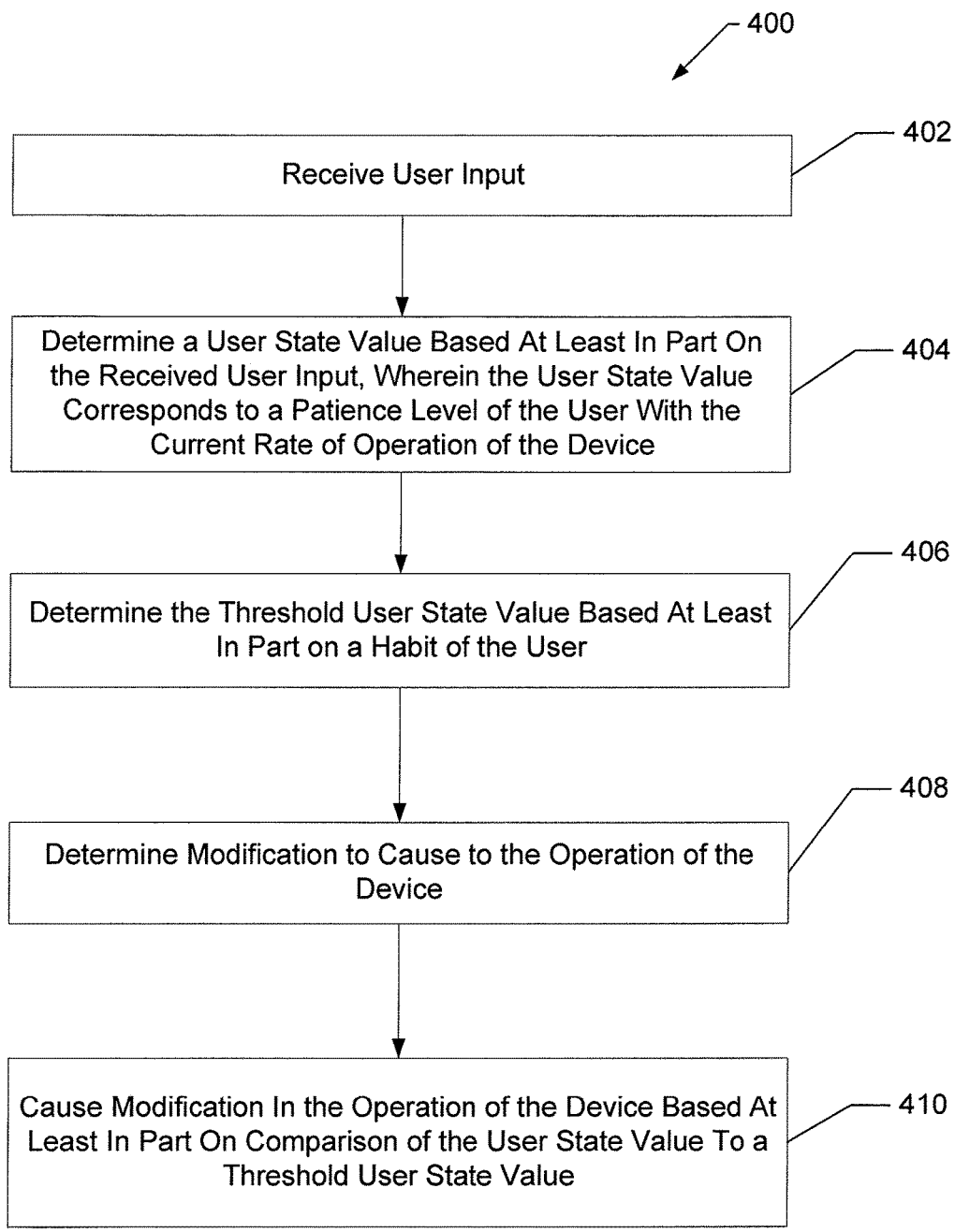

Having thus described embodiments of the invention in general terms, reference will now be made to the accompanying drawings, which are not necessarily drawn to scale, and wherein:

FIG. 1 illustrates a block diagram of an apparatus with a user interface according to an example embodiment;

FIG. 2 is a schematic block diagram of a mobile terminal according to an example embodiment;

FIGS. 3A-3B illustrate example user inputs (e.g., gestures) indicating desired operation of a function on an apparatus, such as the apparatus illustrated in FIG. 1, in accordance with example embodiments described herein;

FIG. 4 illustrates an example display indicating a waiting period for completion of an operation of an apparatus, such as the apparatus illustrated in FIG. 1, in accordance with example embodiments described herein;

FIG. 5 illustrates a flowchart according to an example method for improving operation of a device based on user interaction, in accordance with example embodiments described herein; and FIG. 6 illustrates a flowchart according to another example method for improving operation of a device based on user interaction, in accordance with example embodiments described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 for facilitating interaction with a user interface according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating interaction with a user interface, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a touch display capable of displaying a graphical user interface. In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, sensor 18, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, sensor 18, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), sensor 18, and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, sensor 118, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, sensor 118, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. The communication interface 114 may additionally be in communication with the memory 112, user interface 116, and/or UI control circuitry 122, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, sensor 118, and/or UI control circuitry 122, such as via a bus. In some example embodiments, the user interface may comprise content display and touch display (e.g., a touch display user interface). As used herein for embodiments of the present invention, a "touch display" or "touch display user interface" may refer to either the entire touch display user interface or just the portion dedicated to user input.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, or user interface 116, such as via a bus.

The UI control circuitry 122 may be configured to receive user input from a user interface 116, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a projected capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The sensor 118 may be in communication with the processor 110 and/or UI control circuitry 122. The sensor 118 may be configured to sense and/or measure certain user input. In some embodiments, the sensor 118 may comprise a pressure sensor configured to measure the amount of force a user applies to the user interface. For example, the sensor 118 may be configured to measure a pressure force from a user that hits or otherwise presses firmly on the screen. Such gestures by the user may indicate that the user is frustrated. In some embodiments, the sensor 118 may transmit such measured data to the processor. In embodiments wherein the apparatus 102 is embodied as a mobile terminal 10, the sensor 118 may be embodied as or comprise the sensor 18 (shown in FIG. 2).

The processor 110 and/or UI control circuitry 122 may be configured to receive user input and/or an indication of user input. The user input may indicate a user's desire for the apparatus 102 to perform a designated function (e.g., run an application, load a website, etc.). In some embodiments, the different components and/or abilities of the apparatus 102 may determine the types of functions able to be performed. Some examples of gestures are shown in FIGS. 3A and 3B.

FIG. 3A illustrates an example user input 250 for an apparatus 200 with a touch display 208 (e.g., user interface 116). In the depicted embodiment, a user 205 positions their pointer finger 207 on or near the display, and particularly, on or near a portion 210 of the display. In some embodiments, the portion 210 of the display may correspond to a predetermined point that is associated with a desired function. In other words, the portion 210 may correlate to a function that can be performed by the apparatus 200. For example, the portion 210 may correlate to an application that grants access to the internet. Likewise, the portion 210 may correspond to another function, such as a hyperlink, game application, etc. Thus, by placing a finger 207 on or near the portion 210 (e.g., "touching"), the user 205 is indicating a desire for the apparatus 200 to perform that related function (e.g., open the internet, access the linked website, launch the game application, etc.). Based on the user input detected by the user interface 116, the processor 110 and/or UI control circuitry 122 may respond, causing performance of the desired function. Though the above detailed user input is described with respect to a designated portion, embodiments of the present invention may receive similar user input not directed at a designated portion of the display.

FIG. 3B illustrates another example user input 255, often referred to as a "swipe gesture", for an apparatus 200 with a touch display 208 (e.g., user interface 116). In the depicted embodiment, a user 205 positions a finger 207 on or near a portion of the display. The user 205 may slide their finger 207 along the display 208 (e.g., along arrow 215). This user input often corresponds to a user's desire to "scroll" or move the display to show displayed content that may be currently off the display. Based on the user input detected by the user interface 116, the processor 110 and/or UI control circuitry 122 may respond, scrolling the previously un-displayed content onto the display for the user. In some embodiments, the processor 110, UI control circuitry 122, sensor 118, and/or user interface 116 may be configured to detect the speed at which the user inputs the swipe gesture. In some embodiments, this detected speed may be used by the processor to determine the speed at which to "scroll" through the content.

As indicated above, there are many types of user inputs that are recognizable by apparatus 102. Some additional known user inputs include pinching or reverse pinching for zooming out or zooming in, respectively. Though the above description provides examples of typical user inputs, embodiments of the present invention can be utilized with any type of user input. In that same vein, though the above detailed user inputs are described with respect to a touch display, embodiments of the present invention may be utilized with apparatus 102 that contains designated user input components, such as buttons or scroll bars.

The processor 110 and/or UI control circuitry 122 may be configured to cause initiation or completion of functions to occur. For example, the processor 110 may be configured to initiate opening of a website or running of an application. In some embodiments, the processor 110 may be configured to run more than one function. With limited processing power for the processor 110, added requirements for processing power (such as from running multiple functions) may lead to detrimental or slower performance of the device (e.g., a function may load slowly). Similarly, a function that requires downloading or access to large files may require added processing power and, thus, may also cause the operation rate of the device to slow.

As used herein, a "function" may refer to a single program, feature, or application run on the apparatus. Additionally, "operation of the device" may refer to the overall processing of the device (e.g., running and/or performance of the device). This "operation" may include the overall result of the device's actions and the actions of other programs, functions, features, devices, etc. for which the current device is in operation with and/or reliant on. For example, a function being operated by the device may require a response and/or input from an externally operated function. Thus, the "operation" (e.g., performance of the function) by the device may depend on the externally operated function. Likewise, the "operation" of the device may be proceeding effectively and yet the user may see only the end result. As such, in some embodiments, the "operation" may be associated with the response generated to the user and/or the time taken to produce the result to the user.

The term "operation rate" and/or "rate of operation" may refer to the performance speed of the device, which may include the perception of the rate of operation of the device by the user. For example, the performance of the device may be acceptable or even exceptional to an objective audience; however, the user may perceive the performance as unacceptable. Thus, in some embodiments, the rate of operation of the device may take into account the perception of the user. As noted above, often the "operation" of the device may be proceeding effectively and yet the user may see only the end result. As such, in some embodiments, the "rate of operation" may be associated with the response generated to the user and/or the time taken to produce the result to the user.

In some embodiments, the processor 110 may be configured to determine the operation rate of the device (e.g., apparatus 102). For example, the processor 110 may be configured to determine how quickly a particular function is being run. Further, in some embodiments, the processor 110 may be configured to compare the rate at which the function is performed to a pre-determined rate. Based on this comparison, the processor 110 may be configured to determine the current operation rate of the device. In some embodiments, the processor 110 may be configured to compare the determined current operation rate to pre-stored operation rates to determine if the device is operating at an acceptable rate. Additionally or alternatively, in some embodiments, the processor 110 may be configured to determine, based on the pre-stored operation rate, whether the device is operating at a "slow", "normal", or "fast" operation rate.

The processor 110 may be configured to determine the function being performed or indicated to be performed by the received user input. For example, upon a user performing user input indicating a desired function, the processor 110 may recognize that function. Likewise, the processor 110 may be configured to determine any function being currently performed or scheduled to be performed by the apparatus 102. Moreover, the processor may be configured to determine certain properties associated with each function/application. For example, the processor 110 may be configured to determine the time that has elapsed since the application has last been used. Similarly, the processor 110 may be configured to determine the time that has elapsed since receiving user input corresponding to or directed at the application. As noted above, the processor 110 may also be configured to determine the processing power being used by the application.

In some embodiments, the processor 110 may be configured to connect to a network. For example, the processor 110 may be configured to grant and/or initiate access to the internet, such as through a network connection. Additionally or alternatively, in some embodiments, the processor 110 may be configured to change the network connection, such as to a different access port with a different priority.

As is consistent with the description above, the processor 110 may be configured to determine and manage operation of the device such as through controlling each function being utilized or requested on the device. As such, the processor 110 may be configured to control (e.g., initiate, interrupt, close, etc.) each function or application being operated by the device.

Performance of a device, such as apparatus 102, may be important for a user. In general, people expect their devices (e.g., smartphones) to operate fast (e.g., run applications fast, surf the internet fast, provide navigational assistance fast, etc.). However, in specific situations, a user may be in a particular hurry to perform a certain action on their device. Moreover, these devices may be operating a large number of applications or downloading a large file, which may cause operation rates to decrease.

As such, embodiments of the present invention provide methods and apparatuses for improving operation of a device based on user interaction. In particular, certain user input may indicate that a user is frustrated or impatient with the current performance or operation rate of the device. For example, a user may repeatedly press the refresh button on a website that is not loading fast enough. Embodiments of the present invention may detect this user input and determine that the user desires a change in the operation rate of the device (e.g., make the website load faster) and, in response, cause a modification to the current operation of the device so as to effect the desired change. In some embodiments, the modification may include closing of applications that are using too much processing power or changing the current network connection in an effort to obtain a faster internet connection. The idea is to take cues from a user's interaction with the device to determine the user's current state (e.g., agitated/frustrated, etc.) and then automatically take measures to improve the behavior of the device accordingly (e.g., increase the operation rate of the device).

In some embodiments, the processor 110 may be configured to determine a user state value based on received user input. The user state value may correspond to a patience level of a user with respect to the current operation rate of the device. For example, if the user is satisfied (e.g., the user is being patient) with the current operation rate of the device, the processor 110 may receive user input indicating such and may determine a corresponding user state value that is low. On the other hand, in an example embodiment, the processor 110 may receive user input indicating that the user is not satisfied (e.g., the user is being impatient) with the current operation rate of the device and may determine a corresponding user state value that is high. Though the above description uses "low" and "high" as determined values for the user state value, other indicators may be used (e.g., numbers, letters, etc.) or the designated "low" or "high" indicators may be reversed depending on the circumstance.

One example of when a user may be impatient with the current operation rate of the device is when the user is in a rush mode. Examples of possible rush mode situations include, using a phone camera to take still image/video of a transitory scene that may be lost if the camera does not respond quickly (e.g., a baby's first steps, a beautiful bird perched on a tree that may fly away any second, etc.), connecting to a website to look up a recipe while in the middle of cooking, restarting an application that offers navigational assistance when the application was accidently closed while driving, etc.

A user in rush mode may typically exhibit anxiety and/or impatience if the device does not respond quickly. This behavior can be sensed by the processor through the user input. As such, the processor 110 may be configured to perceive these cues (e.g., from the received user input) and determine the user's patience level with respect to the current operation speed of the device. In some embodiments, the processor 110 may be configured to assign a value to the determined user's patience level, such as a user state value, based on the received user input. Additionally or alternatively, the processor 110 may be configured to determine a user state value based on a number of different user inputs. In some embodiments, the processor 110 may be configured to set a user state value after each received user input. In other embodiments, the processor 110 may be configured to adjust and/or modify a stored user state value based on the received user input.

FIG. 4 illustrates an example device 200 (e.g., apparatus 102) with a touch display 208. In the depicted embodiment, a downloading bar 265 is displayed on the touch display 208. Such download bars 265 may be common to users of devices, such as apparatus 102, and often corresponds to the progress of a currently executed function. The filled in portion of the downloading bar 265 provides the user with a visual indication of the current progress. As such, depending on the current operation rate of the device, the function may take longer to complete and, accordingly, the download bar 265 may take longer to fill up.

Some functions provide an initiation/execution button/input (e.g., the "refresh" button 270). If a user is not satisfied with the current operation rate (e.g., download speed), the user may "re-press" the refresh button 270 in order to re-initiate the process in hopes that it will complete more quickly. This is often the case when a user is attempting to view a website. As such, the number of times and/or frequency with which the user presses the "refresh" button 270 may provide an indication that the user is unhappy with the current operation rate (e.g., a user may desire to increase the current operation rate). Thus, in some embodiments, the processor 110 may be configured to determine the user state value based at least in part on received user input indicating that a user has repeatedly indicated for a refresh function to occur.

As such, the processor 110 may be configured to determine when a user provides user input indicating a desire to "refresh" or reinitiate the desired function (e.g., when the user presses the refresh button 270). Additionally, the processor 110 may be configured to measure the amount of time that elapses between the consecutive user inputs. The processor 110 may also be configured to compare this time period to a pre-determined threshold time period to determine if the user appears to be impatient with the current operation rate of the device. Then, in an instance in which the determined time period satisfies the threshold time period, the processor may be configured to modify the current user state value accordingly. For example, if a user presses the refresh button once and then repress the refresh button within 5 seconds, the processor 110 may compare this to a threshold value of 30 seconds and, in response, increase the user state value to reflect that the user is impatient with the current operation rate of the device.

Similarly, the processor 110 may be configured to determine the number of times a user indicates user input within a set amount of time. The processor 110 may be configured to compare this number of inputs with a pre-determined threshold number of inputs and, in an instance in which the determined number satisfies the threshold number, the processor 110 may be configured to modify the current user state value. For example, if the user presses the refresh button 6 times within a one minute period, the processor may compare this to a threshold value of 2 times within a one minute period and, in response, increase the user state value to reflect that the user is impatient with the current operation rate of the device.

Additionally, the processor 110 may be configured to determine if the desired function has already completed. In such a circumstance, the processor 110 may be configured to determine that a user's repeated input does not correlate to a low patience level with the operation speed and may instead be related to some intended act. For example, a user may be hitting the refresh button on a website because their exam scores are scheduled to post and the user wishes to continually refresh the website until the exam scores are posted. As such, the processor 110 may be configured to dynamically determine a user state value based on a number of different factors.

Though the above user input is described with respect to a refresh button, embodiments of the present invention may be configured to determine a user state value based on other types of user input, as the above description is not meant to be limited to the refresh button and is included for explanatory purposes. As such, in some embodiments, the processor 110 may be configured to determine the user state value based at least in part on received user input indicating that the user has repeatedly attempted any type of user input within a pre-determined period of time. Similar to the description above with respect to the refresh button, a user may become frustrated and provide user input multiple times, especially when the user perceives that the desired function is not being performed (or not being performed fast enough). Thus, the processor 110 may be configured to determine the number of user inputs within a time period and compare that to a pre-determined threshold number of user inputs in a pre-determined period of time and, in response, modify the user state value accordingly.

As noted herein, another type of common user input is the swipe gesture. The processor 110 may be configured to determine the user state value based at least in part on received user input indicating that the user has performed a swipe gesture at a speed different from a pre-determined speed. For example, if a user is in a rush, they may attempt a swipe gesture at a higher than normal speed. The processor 110 may be configured to measure the speed at which a user swipes across the user interface. The processor 110 may compare this determined speed with a pre-determined threshold swipe gesture speed and, in an instance in which the determined speed satisfies the threshold speed, modify the user state value accordingly. For example, a user may perform a swipe gesture across the display in 0.1 seconds. The processor 110 may measure this time period and compare it to a pre-determined threshold level of 0.2 seconds and, in response, increase the user state value to reflect that the user appears to be impatient with current operation of the device.

Additionally or alternatively, the processor 110 may be configured to determine the user state value based at least in part on received user input indicating that the user has applied an amount of pressure different from a pre-determined amount of pressure. As noted herein, the apparatus 102 may comprise a sensor 118 configured to measure or detect certain occurrences. For example, the sensor 118 may be configured to measure the amount of pressure a user provides to the device and/or display. The processor 110 may receive this measured amount of pressure and may compare the measured amount of pressure to a pre-determined threshold amount of pressure. Then, in an instance in which the measured amount of pressure satisfies the pre-determined threshold amount of pressure, the processor 110 may modify the current user state value accordingly. For example, if a user gets frustrated, they may hit or aggressively press down on the device, especially if they feel their desired user input is not being responded too. In such a circumstance, the processor can determine that this amount of pressure is greater than a threshold amount of pressure (e.g., a "normal" amount) and, in response, increase the user state value to reflect the impatience level of the user with the current operation of the device.

Though the above examples describe a user that appears to be in rush mode, the processor 110 may also determine when a user is being patient with the current operation rate of the device. As such, the processor 110 may be configured to adjust the user state value to reflect a high patient level of a user. Thus, the pre-determined threshold levels may correspond to a high patience level of a user.

The processor 110 may be configured to determine a threshold user state value. In some embodiments, the processor 110 may be configured to determine the threshold user state value based at least in part on a habit of the user. The threshold user state value may correspond to the estimated degree of patience level of the user with the current operation rate of the device. In some embodiments, the threshold user state value may correspond with a rush mode for a user. In some embodiments, the threshold user state value may correspond to a patience level of the user that indicates a user's desire to cause a change in the operation of the device (e.g., to increase the operation rate of the device).

Some devices, such as apparatus 102, are often particular or specific to a user. In such circumstances, the device may have a user profile that identifies the user and accesses set proprieties that may be specific to that user. These types of properties may include specific files, passwords, desktop preference settings, etc. Likewise, in some embodiments, the processor 110 may be configured to modify or save preferences that relate to user input that may be typically received by the user. For example, if a specific user likes to press firmly on the device when entering input, then the processor may save this information under that specific user profile.

The processor 110 may also be configured to set and/or modify the threshold user state value based on the saved user profile information or other information (including received user input). For instance, in the example with the user who always presses firmly on the device when entering input, the processor may set the threshold for a user state value higher to account for this typical behavior. Similarly, the processor 110 may be configured to set and/or modify any of the pre-determined threshold values (e.g., pre-determined threshold time period, pre-determined threshold amount of pressure, etc.). As such, in the previous example, the processor may, additionally or alternatively, set and/or modify the pre-determined threshold amount of pressure, such that an extra amount of measured pressure force would be needed to satisfy the pre-determined amount of pressure.

As such, embodiments of the present invention provide a device that can adaptively adjust the pre-determined thresholds (user state value, amount of pressure, time period, etc.) by studying the way a user interacts with his/her device.

The processor 110 may be configured to compare a current user state value with the pre-determined threshold user state value. In some embodiments, the processor 110 may be configured to continually compare the current user state value with the pre-determined threshold user state value. In other embodiments, the processor 110 may be configured to compare the current user state value with the pre-determined threshold user state value after each received user input. Additionally or alternatively, the processor 110 may be configured to compare the current user state value with the pre-determined threshold user state value after each change in the user state value.

The processor 110 may be configured to cause a modification in the operation of the device based at least in part on comparison of the user state value to a threshold user state value. For example, in some embodiments, the processor may be configured to cause a modification in the operation of the device in an instance in which the user state value satisfies the pre-determined threshold user state value. In some embodiments, the current user state value may satisfy the threshold user state value in an instance in which it meets and/or exceeds the threshold user state value. In other embodiments, the current user state value may satisfy the threshold user state value in an instance in which it meets and/or is lower than the threshold user state value. If a user is in a rush, they may be willing to compromise on some aspects of device's operation (e.g., certain functions/applications) if it results in better performance of the current function of interest. For example, running a number of different functions at one time may cause a particular function (e.g., the function of interest) to run slowly. As such, embodiments of the present invention may adapt the operation of the device according to the perceived patience level of the user to effect a desired change in the operation of the device. In some embodiments, the desired change is increased performance or operation rate of the device.

Though the above example describes a comparison in which the user state value satisfies the threshold user state value, embodiments of the present invention may include other factors or circumstances for comparison between the user state value and the threshold user state value. Likewise, comparison between the user state value and the threshold user state value is not necessarily limited to a time when the user state value satisfies the threshold user state value. For example, a modification may be caused at any time based on a comparison, such as when may be appropriate based on the current operation of the device.

In some embodiments, the processor 110 may be configured to determine one or more modifications to cause to the operation of the device. In particular, the modification made by the processor may depend upon on number of factors, including the function of interest, the functional ability of the device, the processing power, etc. For example, if the function of instant interest is a web browser, the device may try to connect to an alternate access point first before trying to close or suspend any other functions or applications. Along these lines, there are a number of different types of modifications that the processor may cause to effect a desired change in the operation of the device.

In some embodiments, the processor 110 may be configured to cause an application being operated by the device to be closed or suspended. For example, the processor 110 may be configured to selectively close or suspend functions or applications that are running in the background (e.g., being run at the same time, but not currently being displayed on the device). As noted above, these functions may be taking up processor speed or memory and resulting in the slow operation rate of the device. Examples of applications that could be running in the background may be a game that the user was playing few hours ago and forgot to exit; an open Contacts list; an open web browser stuck on a webpage that automatically refreshes (e.g., a sports website during an ongoing sporting event auto refreshes to display the latest score); auto scanning of WLANs, etc. As used herein, "closing" or "suspending" may refer to causing exiting or canceling of an application and/or portion/feature of an application. For example, in one example embodiment, the processor 110 may be configured to exit an application. In another example embodiment, the processor 110 may be configured to deprive/interrupt a currently open application of some and/or all of its processing power and/or functions/features.

In some embodiments, the processor 110 may be configured to determine which application to close or suspend. Additionally, the processor 110 may be configured to determine which application to close or suspend based on at least one of a number of factors. When determining which application to close or suspend, the processor 110 may assign different weight to the factors, such that the determined modification may be customized for the user and/or circumstance.

The processor 110 may be configured to determine which application to close or suspend based on the time elapsed since last use of the application. For example, if an application has been running for a long time (e.g., 6 hours) it may be likely that the user has forgotten that this application was running and, thus, it may be likely that the user is not currently using the application. Therefore, this application may be closed to allow additional processing power for the current application of interest.

The processor 110 may also be configured to determine which application to close or suspend based on the processor power being used by the application. For example, if an application is using a large amount of processing power, the processor 110 may be configured to determine that it would be beneficial to close that application to provide that processing power to the application of interest.

The processor 110 may also be configured to determine which application to close or suspend based on the application currently being used. For example, the application being used (e.g., the application of current interest) may be important, or at least currently important to the user. As such, the processor 110 may want to avoid closing this application when causing modification to the operation of the device. Additionally, however, the processor 110 may be configured to take into account applications related to the current application of interest when determining which application to close.

The above described factors for consideration by the processor for determining which applications to close are just some examples of different possible factors to be considered, and the processor 110 may be configured to determine which application to close based at least on other factors not detailed herein. As such, embodiments of the present invention provide a processor configured to dynamically determine which applications to close based on the circumstances present.

In some embodiments, the processor 110 may be configured to cause modification in the operation of the device by causing the establishment of a different network connection. For example, a faulty network connection may cause a function to not work properly. Likewise, a slow network connection may cause a function to operate at a slower rate. For example, a user may wish to open a website. However, if the network connection is slow, the website might take a long time to open (or it might not open at all). As such, in some embodiments, the processor 110 may be configured to try to establish a different network connection to more quickly open the website. Such embodiments may also be useful in cases when closing applications to increase processing power may not be effective, such as when there is no access to the internet through the current network connection.

An example case of faulty network connection is when a WLAN access point is powered on but is not connected to the internet. Such a situation may arise when the ethernet cable connecting a WLAN access point to a digital subscriber line (DSL)/cable modem is faulty. A device configured to connect to the WLAN access point as the highest priority access point will connect to it, but will not be able to access the internet. Hence, a user trying to access a webpage using the device will not be able to do so (since the WLAN is not connected to the internet) and the device will not try to connect to another network (such as cellular network) since it thinks it is already connected to the internet. This may result in a frustrated user who will most likely show his/her frustration by repeated pressing of the "refresh" button and tapping vigorously on the touch screen. In such a circumstance, embodiments of the present invention may provide a processor configured to recognize the user's frustrations (e.g., the high user state value) and, in response, try to change the network connection to the access point with the next highest priority (e.g., cause a modification to the operation of the device).

Embodiments of the present invention provide methods, apparatus and computer program products for improving operation of a device based upon user interaction. Various examples of the operations performed in accordance with embodiments of the present invention will now be provided with reference to FIGS. 5-6.

FIG. 5 illustrates a flowchart according to an example method for improving operation of devices based upon user interaction according to an example embodiment 300. The operations illustrated in and described with respect to FIG. 5 may, for example, be performed by, with the assistance of, and/or under the control of one or more of the processor 110, memory 112, communication interface 114, user interface 116, sensor 118, or UI control circuitry 122. Operation 302 may comprise receiving user input. The processor 110, user interface 116, sensor 118, and/or UI control circuitry 122 may, for example, provide means for performing operation 302. Operation 304 may comprise determining a user state value based at least in part on the received user input, wherein the user state value corresponds to a patience level of the user with the current rate of operation of a device. The processor 110 may, for example, provide means for performing operation 304. Operation 306 may comprise causing modification in the operation of the device based at least in part on comparison of the user state value to a threshold user state value. The processor 110, user interface 116, and/or UI control circuitry 122 may, for example, provide means for performing operation 306.

FIG. 6 illustrates a flowchart according to another example method for improving operation of devices based upon user interaction according to an example embodiment 400. The operations illustrated in and described with respect to FIG. 6 may, for example, be performed by, with the assistance of, and/or under the control of one or more of the processor 110, memory 112, communication interface 114, user interface 116, sensor 118, or UI control circuitry 122. Operation 402 may comprise receiving user input. The processor 110, user interface 116, sensor 118, and/or UI control circuitry 122 may, for example, provide means for performing operation 402. Operation 404 may comprise determining a user state value based at least in part on the received user input, wherein the user state value corresponds to a patience level of the user with the current rate of operation of a device. The processor 110 may, for example, provide means for performing operation 404. Operation 406 may comprise determining the threshold user state value based at least in part on a habit of the user. The processor 110, user interface 116, sensor 118, and/or UI control circuitry 122 may, for example, provide means for performing operation 406.

Operation 408 may comprise determining the modification to cause to the operation of the device. For example, in some embodiments, the determined modification may be to close or suspend an application. Additionally or alternatively, the processor may be configured to determine which application to close based at least in part on at least one of the time elapsed since last use of the application; the processing power being used by the application, or the application currently being used. In some embodiments, the determined modification may be to attempt to establish a different network connection. The processor 110, user interface 116, sensor 118, and/or UI control circuitry 122 may, for example, provide means for performing operation 408.

Operation 410 may comprise causing modification in the operation of the device based at least in part on comparison of the user state value to a threshold user state value. The processor 110, user interface 116, and/or UI control circuitry 122 may, for example, provide means for performing operation 410.

FIGS. 5-6 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   determining a threshold user state value based on a user profile associated with a device;
   adjusting the threshold user state value based, at least, in part on habits of a user associated with the user profile to form a user-specific threshold user state value, wherein the user-specific threshold state value corresponds to a user-specific threshold patience level with a current rate of operation of the device;
   receiving user input;
   determining, by a processor, a user state value based at least in part on the received user input, wherein the user state value corresponds to a patience level of the user with the current rate of operation of the device;
   determining a first factor and a second factor associated with each of a plurality of applications being currently operated by the device;
   assigning a weight to each of the first factor and the second factor, wherein the weight of the first factor is different than the weight of the second factor;
   determining, based at least in part on the weighted first factor and the weighted second factor associated with each of the plurality of applications being currently operated by the device, an application to be closed or suspended from among the plurality of applications being currently operated by the device;
   causing, in an instance in which the user state value satisfies the user-specific threshold user state value, the determined application to be closed or suspended; and
   causing establishment of a different network connection based at least in part on comparison of the user state value to a threshold user state value.

2. The method according to claim 1, wherein the user state value comprises a rush mode value, and wherein the rush mode value corresponds to a desire by the user to increase the rate of operation of the device.

3. The method according to claim 1, wherein determining the user state value comprises determining the user state value based at least in part on at least one of: received user input indicating that a user has repeatedly indicated for a refresh function to occur, received user input indicating that the user has repeatedly attempted user input within a pre-determined period of time, received user input indicating that the user has applied an amount of pressure on the device different from a pre-determined amount of pressure, or received user input indicating that the user has performed a swipe gesture at a speed different from a pre-determined speed.

4. The method according to claim 1, wherein the first factor is at least in part on at least one of: the time elapsed since last use of the application, processor power being used by the application, or an importance level of the application currently being used.

5. The method according to claim 1, wherein the weight assigned to each of the first factor and the second factor is user configurable.

6. An apparatus comprising:
   a processor; and
   a memory including computer program code, the memory and the computer program code configured to, with the processor, cause the apparatus to:
   determine a threshold user state value based on a user profile associated with a device;
   adjust the threshold user state value based, at least, in part on habits of a user associated with the user profile to form a user-specific threshold user state value, wherein the user-specific threshold state value corresponds to a user-specific threshold patience level with a current rate of operation of the device;
   receive user input;
   determine a user state value based at least in part on the received user input, wherein the user state value corresponds to a patience level of the user with the current rate of operation of the device;
   determine a first factor and a second factor associated with each of a plurality of applications being currently operated by the device;
   assign a weight to each of the first factor and the second factor, wherein the weight of the first factor is different than the weight of the second factor;
   determine, based at least in part on the weighted first factor and the weighted second factor associated with each of the plurality of applications being currently operated by the device, an application to be closed or suspended from among the plurality of applications being currently operated by the device;
   cause, in an instance in which the user state value satisfies the user-specific threshold user state value, the determined application to be closed or suspended; and
   cause establishment of a different network connection based at least in part on comparison of the user state value to a threshold user state value.

7. The apparatus according to claim 6, wherein the user state value comprises a rush mode value, and wherein the rush mode value corresponds to a desire by the user to increase the rate of operation of the device.

8. The apparatus according to claim 6, wherein the memory and the computer program code are further configured to, with the processor, cause the apparatus to determine the user state value based at least in part on at least one of: received user input indicating that a user has repeatedly indicated for a refresh function to occur, received user input indicating that the user has repeatedly attempted user input within a pre-determined period of time, received user input indicating that the user has applied an amount of pressure on the device different from a predetermined amount of pressure, or received user input indicating that the user has performed a swipe gesture at a speed different from a pre-determined speed.

9. The apparatus according to claim 6, wherein the first factor is at least one of: the time elapsed since last use of the application, processor power being used by the application, or an importance level of the application currently being used.

10. The apparatus according to claim 6, wherein the weight assigned to each of the first factor and the second factor is user configurable.

11. Computer program product comprising a non-transitory computer readable medium having program code portions stored thereon, the program code portions being configured when said program product is run on a computer or network device, to:
   determine a threshold user state value based on a user profile associated with a device;

adjust the threshold user state value based, at least, in part on habits of a user associated with the user profile to form a user-specific threshold user state value, wherein the user-specific threshold state value corresponds to a user-specific threshold patience level with a current rate of operation of the device;

receive user input;

determine a user state value based at least in part on the received user input, wherein the user state value corresponds to a patience level of the user with the current rate of operation of the device;

determine a first factor and a second factor associated with each of a plurality of applications being currently operated by the device;

assign a weight to each of the first factor and the second factor, wherein the weight of the first factor is different than the weight of the second factor;

determine, based at least in part on the weighted first factor and the weighted second factor associated with each of the plurality of applications being currently operated by the device, an application to be closed or suspended from among the plurality of applications being currently operated by the device;

cause, in an instance in which the user state value satisfies the user-specific threshold user state value, the determined application to be closed or suspended; and cause establishment of a different network connection based at least in part on comparison of the user state value to a threshold user state value.

12. The computer program product according to claim 11, wherein the user state value comprises a rush mode value, and wherein the rush mode value corresponds to a desire by the user to increase the rate of operation of the device.

13. The computer program product according to claim 11, wherein the program code portions are further configured, when run on a computer or network device, to determine the user state value based at least in part on at least one of: received user input indicating that a user has repeatedly indicated for a refresh function to occur, received user input indicating that the user has repeatedly attempted user input within a pre-determined period of time, received user input indicating that the user has applied an amount of pressure on the device different from a predetermined amount of pressure, or received user input indicating that the user has performed a swipe gesture at a speed different from a pre-determined speed.

14. The computer program product according to claim 11, wherein the first factor is at least one of: the time elapsed since last use of the application, processor power being used by the application, or an importance level of the application currently being used.

15. The computer program product according to claim 11, wherein the weight assigned to each of the first factor and the second factor is user configurable.

16. An apparatus comprising:
means for determining a threshold user state value based on a user profile associated with a device;
means for adjusting the threshold user state value based, at least, in part on habits of a user associated with the user profile to form a user-specific threshold user state value, wherein the user-specific threshold state value corresponds to a user-specific threshold patience level with a current rate of operation of the device;
means for receiving user input;
means for determining a user state value based at least in part on the received user input, wherein the user state value corresponds to a patience level of the user with the current rate of operation of the device;
means for determining a first factor and a second factor associated with each of a plurality of applications being currently operated by the device;
means for assigning a weight to each of the first factor and the second factor, wherein the weight of the first factor is different than the weight of the second factor;
means for determining, based at least in part on the weighted first factor and the weighted second factor associated with each of the plurality of applications being currently operated by the device, an application to be closed or suspended from among the plurality of applications being currently operated by the device;
means for causing, in an instance in which the user state value satisfies the user-specific threshold user state value, the determined application to be closed or suspended; and
means for causing establishment of a different network connection based at least in part on comparison of the user state value to a threshold user state value.

17. The method according to claim 16, wherein the weight assigned to each of the first factor and the second factor is user configurable.

18. The method according to claim 16, wherein the first factor is at least one of: the time elapsed since last use of the application, processor power being used by the application, or an importance level of the application currently being used.

* * * * *

UNITED STATES PATENT AND TRADEMARK OFFICE
CERTIFICATE OF CORRECTION

PATENT NO. : 9,727,232 B2
APPLICATION NO. : 13/250095
DATED : August 8, 2017
INVENTOR(S) : Amitabh Dixit Page 1 of 1

It is certified that error appears in the above-identified patent and that said Letters Patent is hereby corrected as shown below:

In the Claims

Column 22,
Line 49, "predetermined" should read --pre-determined--.

Column 23,
Line 43, "predetermined" should read --pre-determined--.

Column 24,
Line 40, "method" should read --apparatus--.
Line 43, "method" should read --apparatus--.

Signed and Sealed this
Twenty-eighth Day of May, 2019

Andrei Iancu
*Director of the United States Patent and Trademark Office*